Feb. 26, 1946. R. I. BRADLEY 2,395,718
CONDITION RESPONSIVE INDICATING INSTRUMENT
Filed June 11, 1943 2 Sheets-Sheet 1

Inventor
Robert I. Bradley
by Roberts Cushman & Woodberry
att'ys.

Feb. 26, 1946.  R. I. BRADLEY  2,395,718
CONDITION RESPONSIVE INDICATING INSTRUMENT
Filed June 11, 1943  2 Sheets-Sheet 2

Inventor
Robert I. Bradley
by Roberts Cushman & Woodberry
Attys.

Patented Feb. 26, 1946

2,395,718

UNITED STATES PATENT OFFICE 2,395,718

CONDITION RESPONSIVE INDICATING INSTRUMENT

Robert I. Bradley, Belmont, Mass., assignor to Ruth E. Bradley, Belmont, Mass.

Application June 11, 1943, Serial No. 490,451

3 Claims. (Cl. 73—388)

This invention pertains to instruments for indicating variations in the physical characteristics of a selected medium, such instruments including barometers, pressure gauges, thermometers, hygrometers, etc., and relates more particularly to instruments wherein it is unnecessary to indicate minute variations. Among instruments of this more restricted class may be mentioned the popular weather barometers which are intended (in response to variations in atmospheric pressure) to foretell weather changes; thermometers designed, for example, to show when the cooling water of an internal combustion engine is below or above normal; and hygrometers for indicating atmospheric moisture.

In instruments of this general class, it is desirable to use an index or indicator means which shows at a glance and without the necessity for careful inspection the conditions to which the instrument is at the instant responding and to make such index means capable of ready observation from a substantial distance.

Thus a principal object of the present invention is to provide an instrument of the general class above referred to desinged to show variations in a physical condition of the selected medium, for specific instance a weather indicating barometer, having index means clearly readable from a distance and substantially unmistakable in the character of its indication within the range of visibility. A further object is to provide such an instrument employing as its indicating means a window aperture of relatively large area as compared with the external dimensions of the instrument with means for illuminating the window aperture and with means, responsive to the variations which are to be indicated, for occluding the window more or less in accordance with the variations to which the instrument is responsive. A further object is to provide an instrument having a window aperture as its indicating medium and having means for occluding said aperture such that substantially the same degree of occlusion occurs at the same time at all portions of the window area. Other and further objects and advantages of the invention will be pointed out in the following more detailed description and by reference to the accompanying drawings wherein:

Figure 1:
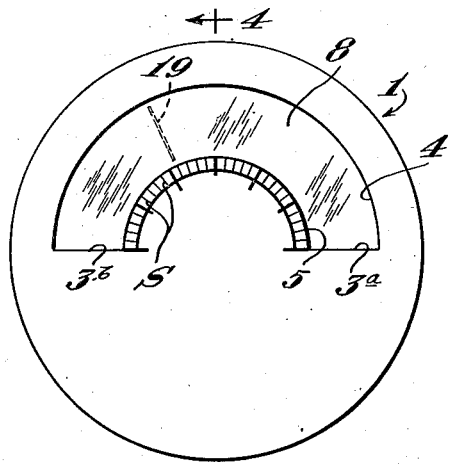
Fig. 1 is a front elevation of a preferred form of instrument with its indicating means arranged at one limit of its range.

Referring to the drawings, the numeral 1 designates the instrument as a whole, said instrument including a case here shown as circular in front elevation, and having the cylindrical side wall 1$^x$ and the front wall 2, the side and front walls here being shown as integral. However, it is to be understood that the front wall may be made as a separate element from the side wall, if desired, and suitably united to the side wall. The front wall is provided with an arcuate (here shown as semi-annular) window aperture 3 bounded by the concentric curved edges 4 and 5 and the radial edges 3$^a$, 3$^b$. This window aperture is of substantial width relatively to the diameter of the case. For example, its radial width may approximate one-sixth the external diameter of the case, and as here shown this window is of substantally 180° circumferential extent.

Figure 5:
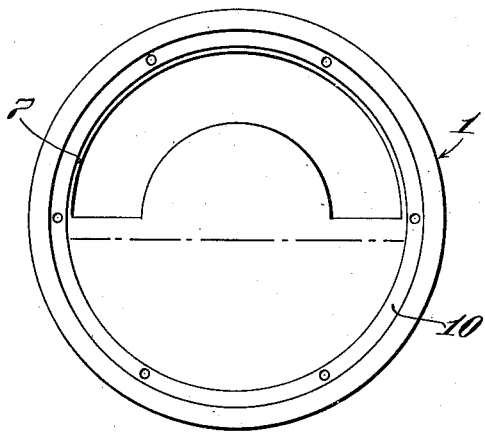
Fig. 5 is a rear elevation of the instrument case with its back wall removed.

The front wall 2 has a flange 7 (Fig. 5) bordering the edge 4 of the window, and a panel 8 of Polaroid material is supported by this flange and by the inner surface of the wall 2 below the window aperture. The Polaroid material may be fixed in place in any desired manner, for example, by appropriate cement, or, if preferred, it may be mounted to permit it to be swung in its own plane, about the center of the case, for adjustment. This "Polaroid" material is of the general type described in the patent to E. H. Land, No. 1,918,848, dated July 18, 1933. It has become a well know article of commerce, its properties as a light polarizer are commonly recognized, and apparently it needs no further description and is herein referred to merly as "Polaroid." It is quite thin and flexible and not easily injured. While "Polaroid" is desirable, it is contemplated that any other material, now or hereafter available, having comparable light occluding properties, may be substituted for Polaroid.

Figure 6:
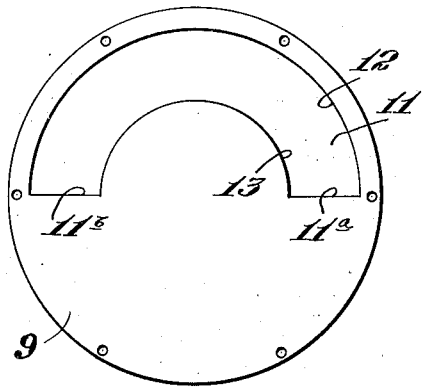
Fig. 6 is a rear elevation of the back wall of the case.

The case is provided with a removable rear wall 9 (Figs. 6 and 7) here shown as of thin sheet material, for example metal, the edge of this rear wall resting in an annular rabbet 10 (Fig. 5) formed in the rear edge of the cylindrical wall of the case. The rear wall is removably secured in place by means of screws (not shown) passing through openings in the rear wall and into threaded openings in the case proper. This rear wall is furnished with an arcuate window aperture 11 (Fig. 6) bounded by the curved concentric edges 12 and 13 and the radial edges 11ᵃ and 11ᵇ. This window aperture 11 is preferably of the same dimensions as the window 3 in the front wall and registers with the latter so that if the instrument be supported against a light background, for instance, if it be hung in a window, light from the background will normally pass through the window aperture 11 and illuminate the window aperture 3. If desired, the aperture 11 may be covered with a panel 14 (Fig. 4) of transparent material, for example Celluloid or glass, in order to prevent the entrance of dust into the interior of the casing, although this transparent panel 14 is not a necessary feature of the invention.

Figures 4, 8:
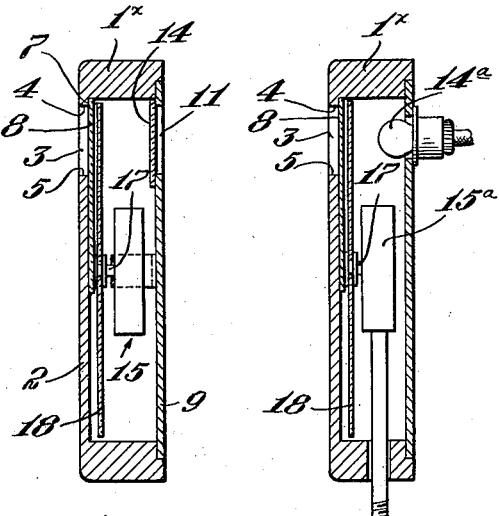
Fig. 4 is a diagrammatic, diametrical section substantially on the line 4—4 of Fig. 1.
Fig. 8 is a section similar to Fig. 4 illustrating a modified construction.
Figure 7:
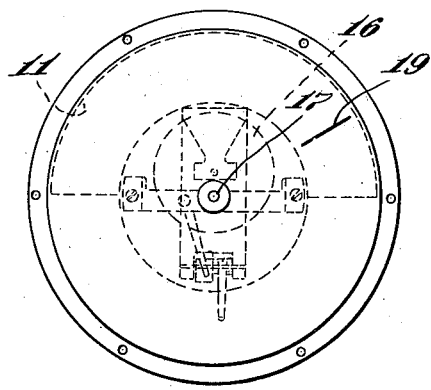
Fig. 7 is a front elevation of the back wall of the case removed from the case.

Supported within the case is a pressure motor 15. This pressure motor may be of any desired type, but, as illustrated in Figs. 4 and 7, it is an aneroid barometer mechanism of simple commercial type. This mechanism is mounted in any desired way upon the back wall 9 of the case. This barometer mechanism is shown as comprising a pressure-sensitive diaphragm or capsule 16 which responds to variations in pressure in the atmosphere, and through appropriate mechanism (not here specifically shown but familiar to those skilled in the art) rocks a rotatable staff 17 through an arc preferably not substantially exceeding 90°. Secured to the forward end of the staff 17 is a disk 18 also of Polaroid and disposed in a plane parallel to that of panel 8 and preferably coaxial with the window aperture 3. The diameter of this disk is such that it covers the entire area of the window aperture 3 whatever the position of staff 17.

It is a characteristic of Polaroid that when two pieces of this material are so relatively arranged that their polarizing crystals are parallel, the passage of light through the two pieces of material is substantially unobstructed, whereas when the pieces of material are so arranged that the crystals in one piece are at right angles to those in the other, the passage of light through the two pieces is substantially prevented.

As arranged in the instrument herein described, the pieces of Polaroid are so relatively positioned that when the staff 17 is at one limit of its rocking movement, corresponding, for example, to the lowest atmospheric pressure for which the instrument is designed, the pieces of Polaroid 8 and 18 behind the window 3 substantially occlude all passage of light through the window aperture, whereas when the staff 17 has turned to the other extreme of its movement, corresponding to the upper limit of the pressure range for which the instrument is designed, the pieces 8 and 18 of Polaroid are so disposed that they obstruct the passage of light but very little.

It may be remarked that when two pieces of Polaroid are moved relatively to each other, so as gradually to obscure the passage of light through them the obscuring effect is uniform throughout the area of the two pieces. Thus the effect is quite different from that which would be obtained were a shutter to be drawn across the aperture, for in the latter case a portion of the aperture would be completely obscured while the remainder would be completely unobscured. By using Polaroid, the amount of light passing through the window is uniform throughout the window area at any setting of the instrument, and the entire area of the window always exhibits the same degree of darkness or light. The entire window area is useful as an indicator of the pressure conditions. Thus, as far as the instrument can be seen, the entire window area is available as an index to tell the observer whether the pressure be high or low.

The instrument as thus far described depends upon illumination from the rear of the instrument case, that is, the entrance of light through the rear window 11 to illuminate the front window 3. However, as illustrated in Fig. 8, it may be preferred to provide the instrument with a closed rear wall and to arrange a lamp 14ᵃ or a series of lamps within the casing so as to illuminate the window 3 from the rear regardless of the location of the instrument. For certain purposes, it may be sufficient merely to make the inner surface of the back wall of the case so that it will reflect light, for instance, it may be painted white. Any of these suggested modifications provides a light background or, in effect, illumination from the rear, for the window aperture in the front wall of the case. Whereas in Figs. 4 and 7 the pressure motor is shown as of the aneroid barometer type, it is contemplated that other types of pressure motor may be employed. Thus, for example in Fig. 8, the motor 15ᵃ may be of the Bourdon tube type having a conduit leading out through the case for connection to a source of variable pressure. Such source of pressure might, for example, be a thermometer bulb containing a fluid which is highly volatile or, alternatively, containing a gaseous medium, and thus as the bulb is subjected to varying temperatures, the pressure in the motor device 15ᵃ will correspondingly vary and the light passing through the window aperture will be more or less occluded correspondingly.

Figure 3:
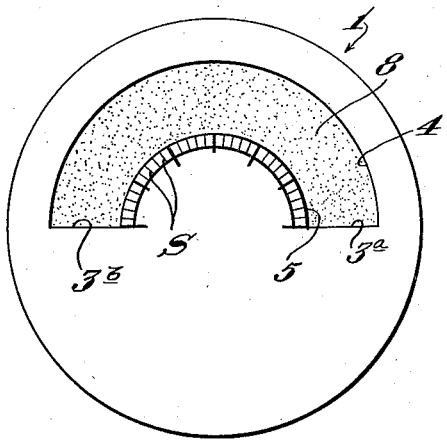
Fig. 3 is a similar view showing the indicating means at an intermediate point in its range.
Figure 2:
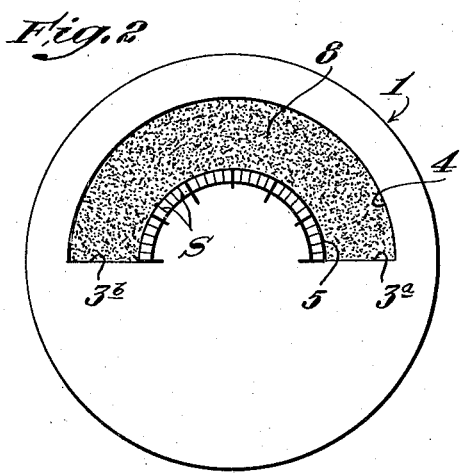
Fig. 2 is a similar view showing the indicating means at the other limit of its range.

Figs. 1, 2 and 3, respectively, illustrate the appearance of the window under varying conditions. Thus, for example, in Fig. 1, the window aperture 3 is shown as fully lighted. If the instrument be an aneroid barometer, the appearance of the window corresponds to a high barometric pressure and thus indicates clear weather. In Fig. 2 the reverse situation is shown, the window aperture being almost completely blackened, corresponding to a very low atmospheric pressure and thus indicating cloudy or stormy weather. Fig. 3 shows the window aperture as it appears at an intermediate pressure condition.

If desired, the front wall of the instrument having the window 3 may be furnished with legends useful in informing the observer as to the meaning of the color appearing at the window. It may also, if desired, be furnished with a graduated scale S and the movable disk of Polaroid may be furnished with an index mark 19 or pointer for cooperation with the scale in order to give more definite indications as to the actual atmopheric pressure, although this latter feature is not an essential characteristic of the invention.

Figure 9:
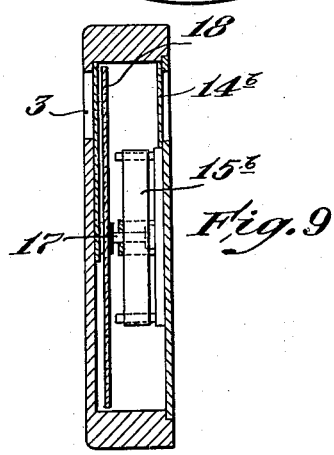
Fig. 9 is a view similar to Fig. 4 but illustrating a hygrometer embodying the invention.

As illustrated in Fig. 9, the invention is embodied in a hygrometer comprising a motor device including an element 15ᵇ which is sensitively responsive to changes in atmospheric moisture and by such response rocks the staff 17 upon which is mounted the Polaroid disk 18. In this embodiment, the light background for the front window aperture 3 is furnished by a light-reflecting surface 14b at the inner side of the rear wall of the case. This surface 14b may be an area of the wall coated with white or fluorescent paint, or it may be a mirror, or in fact any element capable of reflecting and thus furnishing a light background.

While certain desirable embodiments of the invention have herein been disclosed by way of example, it is to be understood that the invention is to be regarded as broadly inclusive of all equivalent constructions falling within the terms of the appended claims.

I claim:

1. In an instrument of the class described, a circular case having cylindrical side walls and a front wall, the front wall having therein a semi-annular window aperture coaxial with the case and of approximately 180° in circumferential extent, means for illuminating said window aperture from the rear, fixed Polaroid panel completely covering said window aperture, a motor device within the housing having a part which moves in response to variations in physical characteristics of a selected medium, and a rocking staff actuated by said movable part to turn through an arc of approximately 90° about the axis of the window aperture, and a second Polaroid panel of dimensions such that in all positions it completely covers the window aperture and which is secured to said staff and disposed in a plane parallel to the first panel, said panels being so arranged that when the staff is at one limit of its movement the passage of light through the aperture is substantially unobstructed and when the staff is at the other limit of its movement the passage of light through the window is substantially occluded.

2. In an instrument for indicating pressure variations in a fluid medium, a circular case having a semi-annular window aperture of a radial width of the order of one-sixth the diameter of the case in its front wall, said aperture being concentric with the case, means for illuminating said aperture from the rear, a pressure motor within the casing, said motor including a staff which rocks backs and forth 90° about the axis of the window aperture in respone to variations in pressure between maximum and minimum, a disc of Polaroid fixed to the staff, said disc being of such diameter as to cover the entire width of the area aperture, and a fixed Polaroid panel covering the window aperture, the disc and panel being so relatively arranged that when the staff is at one limit of its movement the passage of light through the front window aperture is substantially unobstructed and when the staff is at the other limit of its movement the passage of light through the window aperture is substantially occluded.

3. In an instrument of the class described having index means which is clearly visible from a distance, a casing having side walls and a front wall, a motor device within the casing comprising a part which moves in response to variations in physical characteristics of a selected medium, and a rocking staff actuated by said movable part to turn through an arc of approximately 90°, the axis of the staff being substantially at the center of width of the casing and substantially perpendicular to the front wall of the casing, said wall having therein a semi-annular window aperture approximately 180° in circumferential extent, means providing a light background for said window aperture, a fixed Polaroid panel completely covering the window aperture, a second Polaroid panel of dimensions such that in all positions it completely covers the window aperture and which is secured to said staff and disposed in a plane parallel to the first panel, said panels being so arranged that when the staff is at one limit of its rocking movement the passage of light through the aperture is substantially unobstructed and when the staff is at the other limit of its rocking movement the passage of light through the window is substantially occluded.

ROBERT I. BRADLEY.